(12) United States Patent
Kanno et al.

(10) Patent No.: US 10,669,979 B2
(45) Date of Patent: Jun. 2, 2020

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Yoshihito Kanno, Numazu (JP); Gohki Kinoshita, Isehara (JP); Hiroki Morita, Hiratsuka (JP); Yutaro Kawatsu, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 160 days.

(21) Appl. No.: 15/237,743

(22) Filed: Aug. 16, 2016

(65) Prior Publication Data

US 2017/0167461 A1 Jun. 15, 2017

(30) Foreign Application Priority Data

Dec. 10, 2015 (JP) ................. 2015-241246

(51) Int. Cl.
*F02N 11/08* (2006.01)
*F02D 29/02* (2006.01)
(Continued)

(52) U.S. Cl.
CPC .......... *F02N 11/0814* (2013.01); *B60K 6/365* (2013.01); *B60K 6/445* (2013.01);
(Continued)

(58) Field of Classification Search
CPC ............. F02N 11/0814; F02N 2300/30; F02N 2200/023; F02N 2019/008;
(Continued)

(56) References Cited

U.S. PATENT DOCUMENTS 4,376,426 A * 3/1983 Iizuka ................ F02D 41/0087
123/198 F
4,411,230 A 10/1983 Lee
(Continued)

FOREIGN PATENT DOCUMENTS

JP H10-18872 A 1/1998
JP H10169479 A * 6/1998
(Continued)

*Primary Examiner* — Sizo B Vilakazi
*Assistant Examiner* — Brian R Kirby
(74) *Attorney, Agent, or Firm* — Hunton Andrews Kurth LLP

(57) ABSTRACT

A control device is configured to read a required operation point of the internal combustion engine at the moment of restart following after intermittent stoppage, and to execute, when it is determined that the required operation point belongs to a reduced-cylinder operation allowed region and also to a reduced-cylinder operation restricted region which lies on a high load side of the reduced-cylinder operation allowed region, an all-cylinder operation and then move into a reduced-cylinder operation. When it is determined that the required operation point belongs to the reduced-cylinder operation allowed region but not to the reduced-cylinder operation restricted region, the control device is configured to switch the engine to the reduced-cylinder operation without execution of the all-cylinder operation.

4 Claims, 11 Drawing Sheets

(51) Int. Cl.
*F02D 41/00* (2006.01)
*B60K 6/365* (2007.10)
*B60W 20/16* (2016.01)
*B60K 6/445* (2007.10)
*B60W 10/08* (2006.01)
*B60W 10/06* (2006.01)
*F02B 75/18* (2006.01)
*F02D 13/06* (2006.01)
*F02D 17/02* (2006.01)
*F02D 41/26* (2006.01)
*F02N 19/00* (2010.01)
*B60K 6/44* (2007.10)

(52) U.S. Cl.
CPC ............ *B60W 10/06* (2013.01); *B60W 10/08* (2013.01); *B60W 20/16* (2016.01); *F02B 75/18* (2013.01); *F02D 13/06* (2013.01); *F02D 17/02* (2013.01); *F02D 29/02* (2013.01); *F02D 41/0087* (2013.01); *F02D 41/26* (2013.01); *B60K 6/44* (2013.01); *F02N 2019/008* (2013.01); *F02N 2200/023* (2013.01); *F02N 2300/2002* (2013.01); *F02N 2300/30* (2013.01); *Y02T 10/18* (2013.01); *Y02T 10/48* (2013.01)

(58) Field of Classification Search
CPC ......... F02N 2300/2002; F02D 41/0087; F02D 13/06; F02D 17/02; F02D 41/26; F02D 29/02; F02B 75/18; Y02T 10/48; Y02T 10/18; B60K 6/44
See application file for complete search history.

(56) References Cited

U.S. PATENT DOCUMENTS

| | | | | |
|---|---|---|---|---|
| 4,667,626 A * | 5/1987 | Hayashi | ................... | F01P 11/18 123/41.21 |
| 4,723,523 A * | 2/1988 | Kataoka | ................ | F02D 41/065 123/491 |
| 5,394,857 A * | 3/1995 | Yamakawa | ........... | F02D 41/065 123/491 |
| 5,845,486 A * | 12/1998 | Yamashita | ................ | F01N 3/20 60/274 |
| 5,881,552 A * | 3/1999 | Iwata | ..................... | F02D 41/005 477/100 |
| 6,205,776 B1 * | 3/2001 | Otsuka | ................ | F02D 41/0087 123/492 |
| 6,257,207 B1 * | 7/2001 | Inui | ..................... | F02D 41/0087 123/480 |
| 6,389,806 B1 * | 5/2002 | Glugla | ................... | F02B 75/22 60/284 |
| 6,520,158 B1 * | 2/2003 | Mills | ....................... | F02D 17/02 123/198 DB |
| 6,668,546 B2 * | 12/2003 | Hayman | ................... | F01L 1/02 60/284 |
| 6,772,724 B2 * | 8/2004 | Glugla | ................... | F02B 75/22 123/179.5 |
| 6,931,839 B2 * | 8/2005 | Foster | ..................... | F01N 3/023 123/481 |
| 8,096,286 B2 * | 1/2012 | Asai | ....................... | F02D 17/02 123/198 F |
| 8,122,862 B2 * | 2/2012 | Hicks | ..................... | F01L 1/146 123/90.16 |
| 8,935,074 B2 * | 1/2015 | Imamura | ................ | F02D 13/06 123/198 DB |
| 2001/0015065 A1 * | 8/2001 | Ide | ............................ | F01N 9/00 60/285 |
| 2003/0089330 A1 * | 5/2003 | Azuma | ............... | F02D 41/0087 123/198 F |
| 2003/0154711 A1 | 8/2003 | Hayman et al. | | |
| 2004/0098970 A1 * | 5/2004 | Foster | ..................... | F01N 3/023 60/284 |
| 2005/0049108 A1 * | 3/2005 | Nishizawa | ............ | B60W 10/06 477/37 |
| 2006/0231078 A1 * | 10/2006 | Barylski | ............ | F02M 37/0029 123/511 |
| 2007/0118269 A1 * | 5/2007 | Gibson | ................ | F02D 41/266 701/84 |
| 2009/0150055 A1 * | 6/2009 | Kaiser | .................... | B60K 6/485 701/105 |
| 2010/0063710 A1 * | 3/2010 | Asai | ........................ | F02D 17/02 701/103 |
| 2010/0222989 A1 * | 9/2010 | Nishimura | .............. | F01L 1/053 701/105 |
| 2010/0300781 A1 * | 12/2010 | Leone | .................... | B60K 6/442 180/65.29 |
| 2010/0307458 A1 * | 12/2010 | Asai | ....................... | F02D 41/064 123/491 |
| 2011/0146602 A1 * | 6/2011 | Kato | ...................... | F01L 1/3442 123/90.12 |
| 2011/0197860 A1 * | 8/2011 | Aso | ........................ | F02D 41/047 123/491 |
| 2012/0180456 A1 * | 7/2012 | Yamada | ................ | B60W 10/30 60/274 |
| 2012/0204827 A1 * | 8/2012 | Sieber | ................ | F02D 41/0087 123/179.4 |
| 2013/0211692 A1 * | 8/2013 | Asami | ................... | B60W 20/00 701/103 |
| 2013/0276749 A1 * | 10/2013 | Springer | ................ | F02D 17/02 123/349 |
| 2014/0169991 A1 * | 6/2014 | Byun | ...................... | F01P 7/044 417/201 |
| 2014/0216368 A1 * | 8/2014 | Sasaki | ..................... | F02D 13/06 123/41.08 |
| 2014/0245993 A1 * | 9/2014 | Weber | .................... | F02D 13/06 123/349 |
| 2014/0296025 A1 * | 10/2014 | Fushiki | ................. | B60W 10/04 477/3 |
| 2015/0053175 A1 * | 2/2015 | Nishimoto | ............... | F01M 1/02 123/350 |
| 2015/0268102 A1 * | 9/2015 | Miyata | ................... | G01K 13/02 702/50 |
| 2015/0345407 A1 * | 12/2015 | Glugla | .................. | F02D 17/02 123/403 |
| 2015/0354477 A1 * | 12/2015 | Leone | .................... | F02P 5/1516 123/406.26 |

FOREIGN PATENT DOCUMENTS

| | | | | |
|---|---|---|---|---|
| JP | 2004-143989 A | | 5/2004 | |
| JP | 2004-346903 A | | 12/2004 | |
| JP | 2004346903 A | * | 12/2004 | ............. F02D 13/06 |
| JP | 2008-128016 A | | 6/2008 | |
| JP | 2011-236871 A | * | 11/2011 | ........... Y02T 10/142 |
| JP | 2011236871 A | * | 11/2011 | |

* cited by examiner

CONTROL DEVICE FOR INTERNAL COMBUSTION ENGINE

CROSS-REFERENCE TO RELATED APPLICATION

The present application claims priority to Japanese Patent Application No. 2015-241246 filed Dec. 10, 2015, which is incorporated herein by reference in its entirety.

TECHNICAL FIELD

The present invention relates to a control device applied to an internal combustion engine capable of executing a reduced-cylinder operation.

BACKGROUND ART

There is known to be an internal combustion engine which is capable of executing a reduced-cylinder operation where at least one of an intake valve and an exhaust valve for each cylinder of a part of plural cylinders is closed and thereby the part of plural cylinders are halted and the rest of cylinders are operated. It is known that the reduced-cylinder operation is effective to improve fuel consumption by reducing intake resistance. However, the execution of reduced-cylinder operation is sometimes restricted in various situations.

For example, there is known to be a control device that prohibits the reduced-cylinder operation which accompanies reduction of negative pressure of a surge tank in a case that evaporative fuel is purged to an intake system from a canister housing the evaporative fuel or in a case that negative pressure of a brake booster is reduced (Patent Literature #1). Further, there is also known to be a control device that sets waiting time for execution of the reduced-cylinder operation based on an engine water temperature at the moment an internal combustion engine starts up, the waiting time being required for increasing an oil temperature to a degree that the viscosity of oil decreases sufficiently, the oil being used for driving a cylinder halt system to be used for the execution of the reduced-cylinder operation (Patent Literature #2). In addition, there is known to be Patent Literatures #3 and #4 as prior art literatures relating to the present invention.

CITATION LIST

Patent Literatures

Patent Literature #1: JP2004-143989
Patent Literature #2: JP2004-346903
Patent Literature #3: JP2008-128016
Patent Literature #4: JP H10-18872

SUMMARY OF INVENTION

Technical Problem

The number of pieces of particulates (PN) is one indicator of emission regulations of an internal combustion engine. The PN more increases as a fuel injection volume per one cylinder gets larger. The increase rate of the PN becomes higher as an inside temperature of a combustion chamber (the inside temperature of a cylinder) gets lower.

In the above mentioned reduced-cylinder operations, the intake air quantity and fuel injection quantity per cylinder get larger in comparison with an all-cylinder operation in a case that the output equivalent to one in the all-cylinder operation is obtained by the air-fuel ratio equivalent to one in the all-cylinder operation. As the control devices of Patent Literature #1 and the like are not configured to restrict the execution of reduced-cylinder operation in the light of a matter whether the PN increases or not, the execution of reduced-cylinder operation could make the PN increase.

With that, the present invention aims to provide a control device for an internal combustion engine which is capable of suppressing increase of the PN.

Solution to Problem

A control device for an internal combustion engine as one aspect of the present invention is a control device for an internal combustion engine having a plurality of cylinders, the internal combustion engine being capable of executing an operation at a predetermined target air-fuel ratio selectively either a reduced-cylinder operation where a part of the plurality of cylinders are operated and a rest of the plurality of cylinders are halted or a particular operation where more cylinders are operated than in the reduced-cylinder operation, and being capable of restarting following after intermittent stoppage, the control device being configured by a computer executing a computer program to control the internal combustion engine so that the reduced-cylinder operation is executed in a case that a required operation point of the internal combustion engine belongs to a predetermined reduced-cylinder operation allowed region, wherein the control device is further configured by the computer executing the computer program to, in a case that the required operation point of the internal combustion engine belongs to the reduced-cylinder operation allowed region at a moment of restart following after the intermittent stoppage of the internal combustion engine, control the internal combustion engine so that, further in a case that the required operation point lies on a high load side, after execution of the particular operation the internal combustion engine is switched to the reduced-cylinder operation, and in a case that the required operation point lines on a low load side, without the execution of the particular operation, the international combustion engine is switched to the reduced-cylinder operation.

In a case of an internal combustion engine capable of executing the intermittent stoppage, if the operation of the internal combustion engine is stopped, since an inside temperature of a cylinder decreases along with elapse of stop time, this provides a situation of restart that the PN is likely to increase. Therefore, at the moment of restart following after the intermittent stoppage, if the reduced-operation is executed immediately based on a reason that the required operation point belongs to the reduced-cylinder operation allowed region, because of increase of fuel injection quantity per cylinder, the possibility that the PN increases is made to be higher. Further, since the fuel injection quantity per cylinder in a high load case of the internal combustion engine is more than in a low load case, in the high load case the problem that the PN increases at the moment of restart becomes more salient. According to the control device of the present invention, even if the required operation point belongs to the reduced-cylinder operation allowed region where the reduced-cylinder operation is possible, in a case of the moment of restart following after the intermittent stoppage and also the high load side, after the particular operation where more cylinders operate than in the reduced-cylinder operation is executed, and then the reduced-cylinder operation is executed. Because of the execution of the particular operation, it is possible to raise the inside temperature of the cylinder while suppressing increase of the fuel injection quantity per cylinder. Accordingly, since the reduced-cylinder operation is executed avoiding the situation such that the possibility the PN increases is made to be higher, it is possible to suppress the increase of PN in comparison with a case that the reduced-cylinder operation is executed immediately after the restart. In addition, even in a case that the required operation point belongs to the reduced-cylinder operation allowed region at the moment of restart, if on the low load side, the fuel injection quantity per cylinder is comparatively small. Therefore, the necessity of executing the particular operation is small. Accordingly, the control device of the present invention is configured to switch the internal combustion engine to the reduced-cylinder operation without the execution of the particular operation in a case that the required operation point at the moment of restart following after the intermittent stoppage belongs to the reduced-cylinder operation allowed region and also lies on the low load side thereof. Thereby, there is a merit such that it is possible to ensure a long execution time of the reduced operation.

As one embodiment of the control device of the present invention, the control device may be further configured to control the internal combustion engine so that the particular operation is executed longer as intermittent stoppage time which is duration from a moment of last stoppage up to a moment of restart this time gets longer. As the intermittent stoppage time gets longer, the inside temperature of the cylinder more decreases. Due to this, it takes a long time to raise the inside temperature of the cylinder by the particular operation executed after the restart. According to this embodiment, in a case that the inside temperature of the cylinder is comparatively high because of a short intermittent stoppage time, it is possible to switch the internal combustion engine to the reduced-cylinder operation as early as possible, with avoiding an excessively long execution of the particular operation. Thereby, in a case that the inside temperature of the cylinder is comparatively high because of a short intermittent stoppage time, it is possible to reduce demerits, such as deterioration of fuel efficiency, caused by a prolonged particular operation.

In the particular operation, the more the number of operating cylinders is than the number in the reduced-cylinder operation, naturally it is possible to more suppress the increase of fuel injection amount per cylinder. Therefore, this is efficient for suppression of increase of the PN. The control device may be further configured to execute an all-cylinder operation where all of the plurality of cylinders are operated as the particular operation. In this case, it is possible to obtain the effect of suppression of increase of the PN at a maximum.

Effect of Invention

As mentioned above, according to the control device of the present invention, it is possible to suppress the increase of the PN after the restart.

DESCRIPTION OF EMBODIMENTS (First Embodiment)

Figure 1:
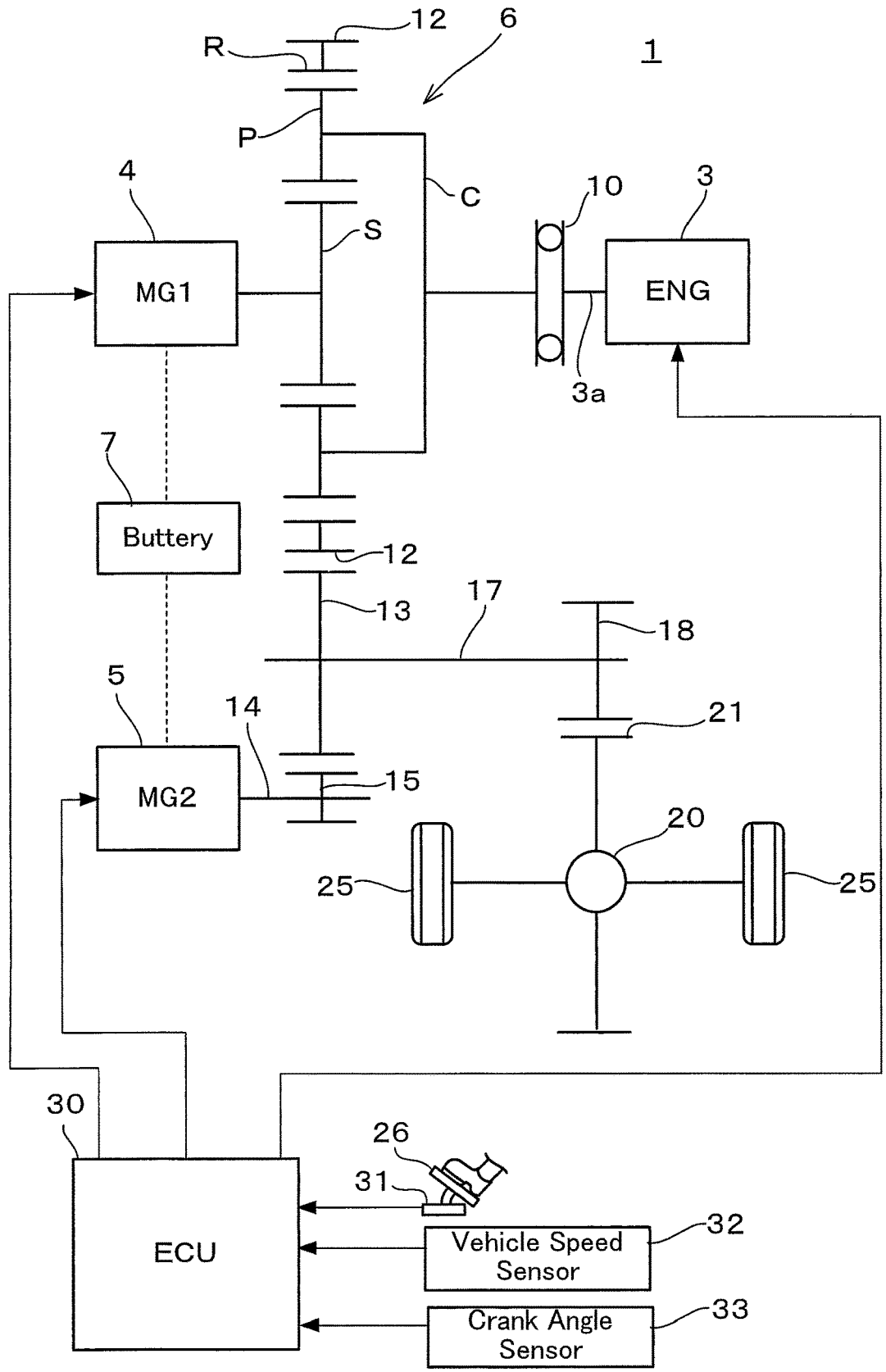
FIG. 1 is a diagram showing a whole configuration of a hybrid vehicle where a control device according to one embodiment of the present invention is applied.

As shown in FIG. 1, a vehicle 1 is configured as a hybrid vehicle where plural power sources are combined. The vehicle 1 comprises an internal combustion engine 3 and two motor generators 4 and 5 as driving sources for traveling. The internal combustion engine 3 is configured as a reciprocating spark-ignition internal combustion engine which has a plurality of cylinders (not illustrated), and operated with a predetermined target air-fuel ratio (for example, a theoretical air-fuel ratio). The internal combustion engine 3 can execute an all-cylinder operation as a particular operation where all of the plurality of cylinders are operated and a reduced-cylinder operation where a part of the plurality of cylinders are halted and the rest of cylinders are operated. The switching between the all-cylinder operation and the reduced-cylinder operation is executed by a cylinder halting system not illustrated. As well known, the cylinder halting system is configured to halt the part of the plurality of cylinders by closing at least one of an intake valve and an exhaust valve for each cylinder of the part of the plurality of cylinders The internal combustion engine 3 and a first motor generator 4 are connected with a power split mechanism 6. The first motor generator 4 functions as an electric generator which generates electricity by receiving power of the internal combustion engine 3 which has been split by the power split mechanism 6, and also functions as an electric motor which is driven by alternating-current power. As with that, a second motor generator 5 functions as the electric generator and also the electric motor. Each of the first motor generator 4 and the second motor generator 5 is connected electrically with a battery 7.

The power split mechanism 6 is configured as a single pinion type planetary-gear mechanism. The power split mechanism 6 has a sun gear S which is an external gear, a ring gear R which is an internal gear arranged coaxially with the sun gear S, and a planet career C holding a pinion P rotatably and orbitably, the pinion P engaging with the gears S and R. Engine torque outputted by the internal combustion engine 3 is transmitted to the plant career C of the power split mechanism 6 via a torsional damper 10. A crank shaft 3a of the internal combustion engine 3 is connected with an input side of the torsional damper 10, and the planet career C is connected with an output side of the torsional damper 10. The first motor generator 4 is connected with the sun gear S of the power split mechanism 6.

An output gear 12 which is an external gear is provided on the outer circumference of the ring gear R of the power split mechanism 6. The output gear 12 engages with a driven gear 13. A motor gear 15 engaging with the driven gear 13 is provided on a motor shaft 14 of the second motor generator 5. The driven gear 13 is fixed to a counter shaft 17, and a drive gear 18 is fixed to the counter shaft 17. The drive gear 18 engages with a ring gear 21 of a differential mechanism 20. Accordingly, torque outputted from the output gear 12 and motor torque of the second motor generator 5 are transmitted to the differential mechanism 20 via the driven gear 13 and the drive gear 18. The torque transmitted to the differential mechanism 20 is divided into right and left drive wheels 25.

As is apparent from the configuration of the vehicle 1, by control of motor torque and motor speed of the first motor generator 4 connected with the power split mechanism 6, it is possible to change an operation point of the internal combustion engine 3, the operation point being defined by the engine speed and engine torque (the load) of the internal combustion engine 3, with maintaining the rotational speed of the output gear 12, that is, the vehicle speed.

Each part of the vehicle 1 is controlled by an electric control unit (ECU) 30 configured as a computer. The ECU 30 executes various kinds of control for the internal combustion engine 3, the motor generators 4 and 5, and the like respectively. Various kinds of information of the vehicle 1 are inputted to the ECU 30. For example, inputted to the ECU 30 are: an output signal by an accelerator opening-degree sensor 31 which outputs a signal corresponding to the depressed amount of an accelerator pedal 26; an output signal by a vehicle speed sensor 32 which outputs a signal corresponding to the vehicle speed of the vehicle 1; and an output signal by a crank angle sensor 33 which outputs a signal corresponding to a crank angle of the internal combustion engine 3.

The ECU 30 refers to the output signal of the accelerator opening-degree sensor 31 and the output signal of the vehicle speed sensor 32 to calculate a required output required by a driver, and controls the vehicle 1 with switching of various kinds of modes so that system efficiency becomes optimal with respect to the required output. For example, in a low load region where heat efficiency of the internal combustion engine 3 decreases, an EV mode is selected, where combustion of the internal combustion engine 3 is stopped and the second motor generator 5 is driven. Further, in a case that torque of the internal combustion engine 3 is not enough or a remaining capacity of the battery 7 is not enough, a hybrid mode is selected, where the internal combustion engine 3 or the second motor generator 5 together with the internal combustion engine 3 is used as a driving source for traveling.

In a case that driving conditions have changed while the vehicle 1 is traveling, the ECU 30 switches an operation mode of the vehicle 1 from the hybrid mode to the EV mode by stopping combustion of the internal combustion engine 3, otherwise, switches an operation mode of the vehicle 1 from the EV mode to the hybrid mode by starting the internal combustion engine 3. In this way, the vehicle 1 executes as a feature of a hybrid vehicle, an intermittent operation mode where start and stoppage of the internal combustion engine 3 are alternately repeated in a comparatively short time. It is sometimes called intermittent stoppage to stop the internal combustion engine 3 for switching the operation mode from the hybrid mode to the EV mode while the intermittent operation mode is executed. As stoppage time of the internal combustion engine 3 gets longer, the inside temperature of the cylinder more decreases. The present embodiment is characterized by a control which is executed at a moment when the internal combustion engine 3 restarts following after the intermittent stoppage. Hereinafter, in reference to FIGS. 2 to 5, the control executed by the ECU 30 will be described.

Figure 2:
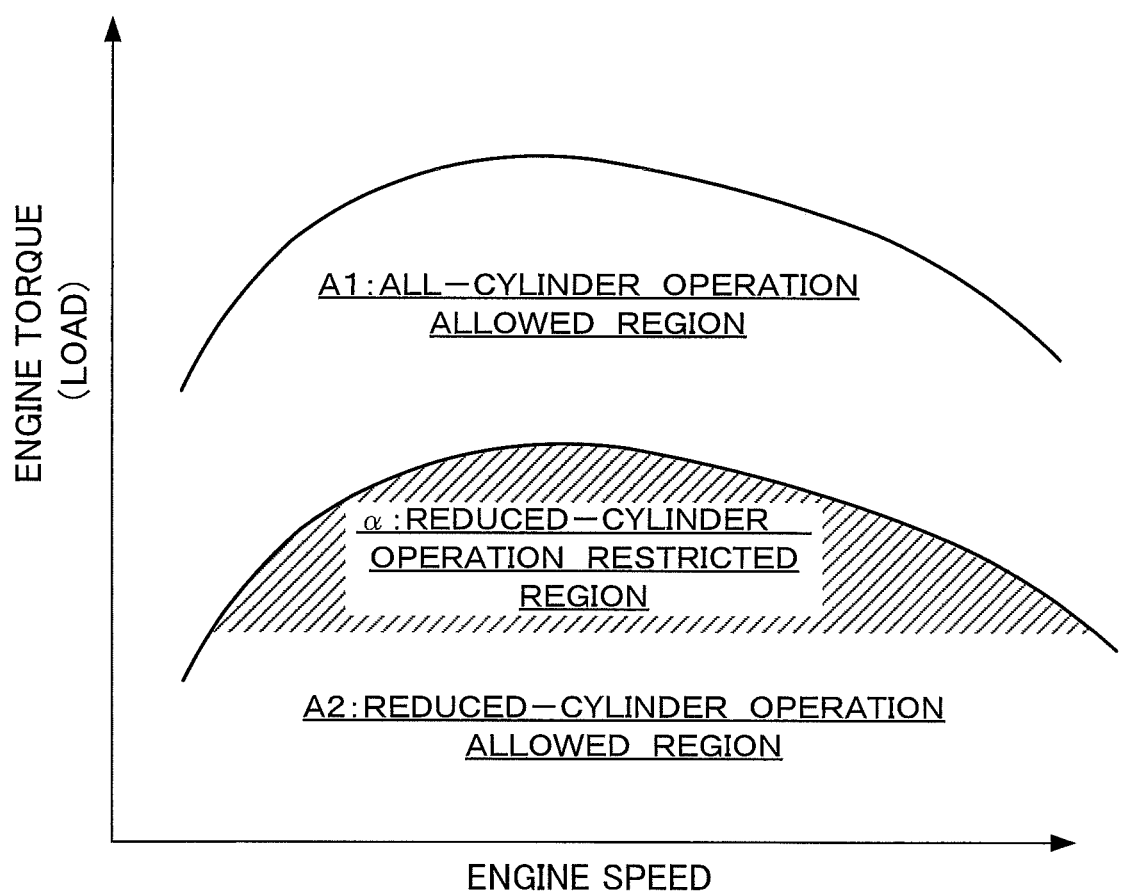
FIG. 2 is a diagram showing each region for switching between an all-cylinder operation and a reduced-cylinder operation.

As is shown in FIG. 2, the switching between the all-cylinder operation and reduced-cylinder operation of the internal combustion engine 3 is executed based on a fact whether or not a required operation point of the internal combustion engine 3 belongs to any one of an all-cylinder operation allowed region A1 and a reduced-cylinder operation allowed region A2, the regions A1 and A2 having been set in an operation region of the internal combustion engine 3. That is, in a case that the required operation point of the internal combustion engine 3 belongs to the all-cylinder operation allowed region A1, the all-cylinder operation is executed. In a case that the required operation point of the internal combustion engine 3 belongs to the reduced-cylinder operation region A2, the reduced-cylinder operation is executed. However, in a case of the restart following after the intermittent stoppage, even if the required operation point belongs to the reduced-cylinder operation allowed region A2, in a case that engine torque of the internal combustion engine 3 is high, that is, in a case of a high load, the reduced-cylinder operation is restricted and the all-cylinder operation is executed. For executing such a control, a reduced-cylinder operation restricted region .alpha. shown with hatching, is set in the reduced-cylinder operation allowed region A2. In a case that the required operation point of the internal combustion engine 3 belongs to the reduced-cylinder operation restricted region .alpha. at the moment of the restart following after the intermittent stoppage, the ECU 30 executes the all-cylinder operation even if the reduced-cylinder operation is possible. After that, the ECU 30 continues to execute the all-cylinder operation until a particular operation time is expired, the particular operation time being set so that the inside temperature of the cylinder reaches a temperature that the PN generation amount becomes a predetermined value or lower, and after the particular operation time elapses, the ECU 30 switches the cylinders mode to the reduced-cylinder operation. On the other hand, in a case that the required operation point does not belong to the reduced-cylinder operation restricted region .alpha., that is, that the required operation point is in a low load side, the ECU 30 does not execute the all-cylinder operation but switches the cylinders mode to the reduced-cylinder operation, based on the reduced-cylinder operation allowed region A2.

Figure 3:
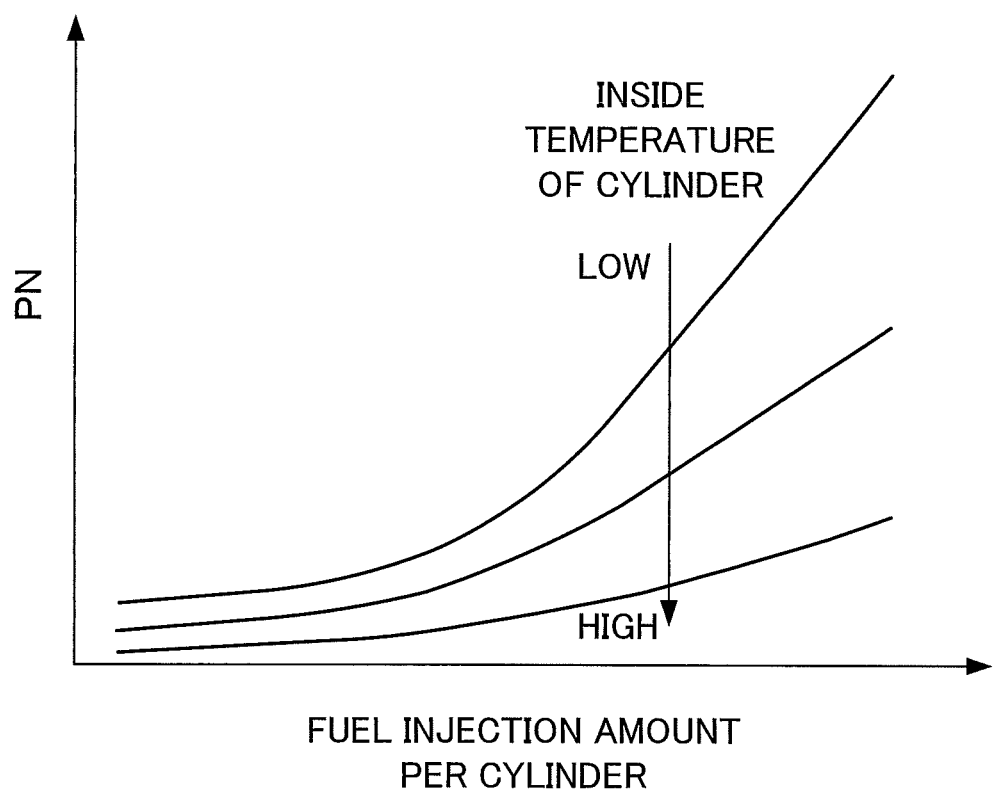
FIG. 3 is diagram showing a characteristic that a relation between a fuel injection amount per cylinder and the PN changes depending on an inside temperature of a cylinder.

As mentioned above, in a case that the reduced-cylinder operation obtains the same outputs with the same air-fuel ratio as the all-cylinder operation, the intake air quantity and fuel injection quantity per cylinder get larger in comparison with a case of the all-cylinder operation. As is shown in FIG. 3, the PN has characters such that the PN more increases as the fuel injection quantity per cylinder gets more, and also an increase ratio of this increase becomes higher as the inside temperature of the cylinder gets lower. Further, as the execution time of the all-cylinder operation gets longer, the inside temperature of the cylinder becomes higher. Accordingly, the decrease of inside temperature of the cylinder by the execution of the reduced-cylinder operation and the intermittent stoppage could make the PN increase. Therefore, at the moment of restart following after the intermittent stoppage, even if the reduced-cylinder operation is possible, the cylinders mode is switched to the reduced-cylinder operation after the all-cylinder operation is executed.

Figure 4:
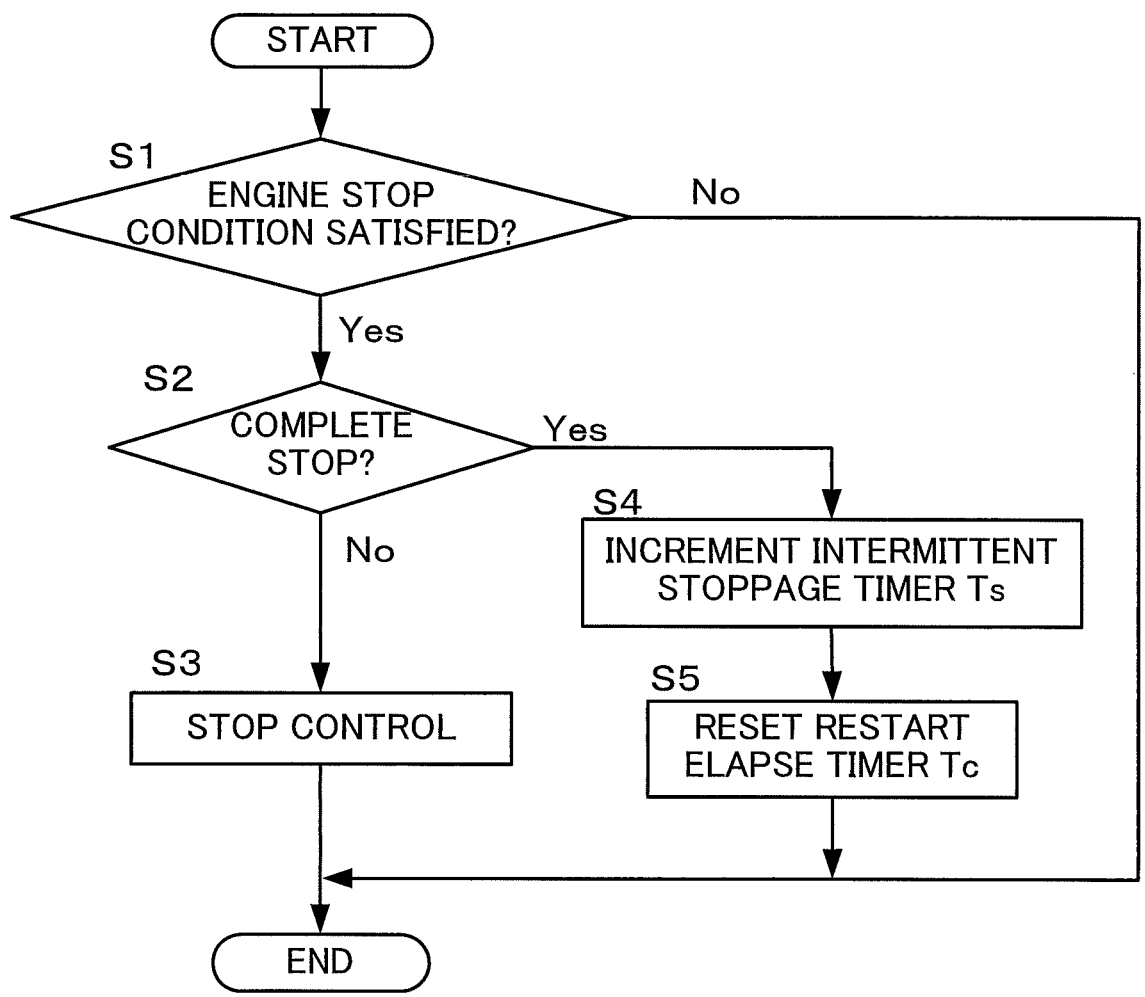
FIG. 4 is a flow chart showing one example of a control routine according to a first embodiment, the control routine being used for stopping the internal combustion engine.
Figure 5:
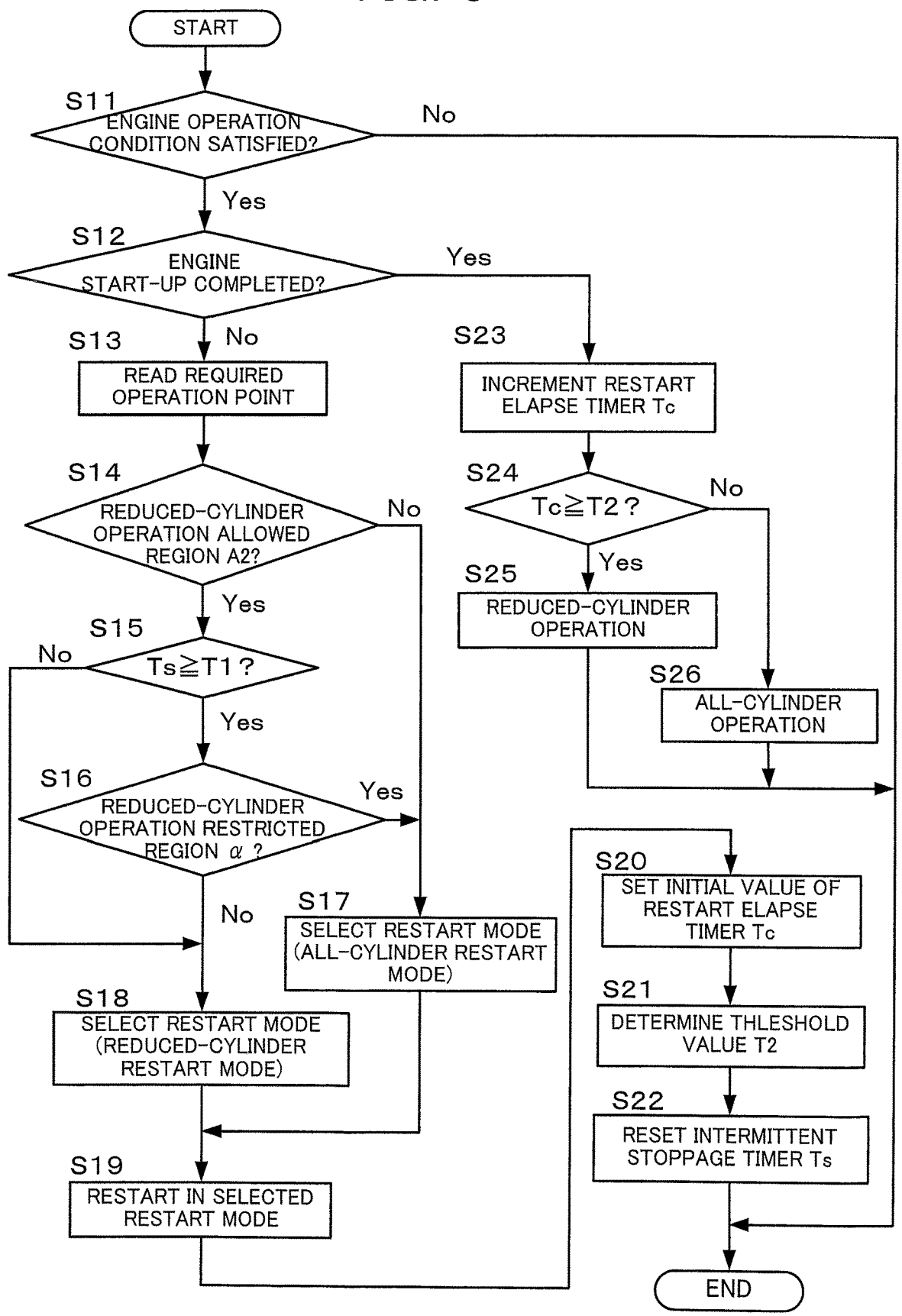
FIG. 5 is a flow chart showing one example of a control routine according to the first embodiment, the control routine being used for restart and operation after the restart of the internal combustion engine.

As one embodiment where the above mentioned control is realized, the ECU 30 executes control routines shown in FIGS. 4 and 5 in a parallel way. Computer programs for the control routines of FIGS. 4 and 5 are held by the ECU 30 respectively. Each of the computer programs is read out as necessary and executed repeatedly at a predetermined interval. Thereby, the ECU 30 functions as the control device of the present invention.

The stoppage of the internal combustion engine 3 is executed by the control routine shown in FIG. 4. First, at step S1, the ECU 30 determines whether an engine stop condition has been satisfied. For example, the ECU 30 obtains a state of the vehicle 1 by referring to output signals from the accelerator opening-degree sensor 31 and vehicle speed sensor 32, and determines that the engine stop condition has been satisfied when the vehicle is being stopping, the EV mode is appropriate for traveling since the required output is low, or the like. The ECU 30 goes to step S2 in a case that the engine stop condition has been satisfied, and if this is not the case, the ECU 30 skips the following steps and ends this current routine.

At step S2, the ECU 30 determines whether the stoppage of the internal combustion engine 3 has been completed. In a case that the stoppage of the internal combustion engine 3 has been completed, the ECU 30 goes to step S4, and if this is not the case, the ECU 30 goes to step S3.

At step S3, the ECU 30 executes a stop control of the internal combustion engine 3. The stop control is a well-known control including a control such that a crank shaft is made to stop at a predetermined piston position for preparation for the moment of restart of the internal combustion engine 3. Due to this, the details of this stop control will be omitted.

At step S4, the ECU 30 increments an intermittent stoppage timer Ts. The intermittent stoppage timer Ts is a variable for managing time after the internal combustion engine 3 stops. For example, the intermittent stoppage timer Ts is updated by adding 1 to the intermittent stoppage timer Ts, and thereby, the intermittent stoppage timer Ts is incremented. Next, at step S5, the ECU 30 resets a restart elapse timer Tc. The restart elapse timer Tc is a variable for managing time after the internal combustion engine 3 was restarted.

The restart following after the intermittent stoppage of the internal combustion engine 3 and the operation thereafter are executed by the control routine shown in FIG. 5. At step S11, the ECU 30 determines whether the engine operation condition has been satisfied. It is determined by obtaining the state of the vehicle 1 as with the engine stop condition, whether the engine operation condition has been satisfied. For example, the ECU 30 determines that the engine operation condition has been satisfied in such a case that the internal combustion engine 3 should be restarted for switching the operation mode to the hybrid mode because the required output rises when the vehicle 1 is traveling in the EV mode.

At step S12, the ECU 30 determines whether the restart of the internal combustion engine 3 has been completed. The ECU 30 determines this depending on whether the engine speed is beyond a restart-completion determining value by referring to the output signal from the crank angle sensor 33. In a case that the restart of the internal combustion engine 3 has been completed, the ECU 30 goes to step S23. On the other hand, in a case that the restart of the internal combustion engine 3 has not been completed, the ECU 30 executes steps S13 to S19 in order to restart the internal combustion engine 3.

At step S13, the ECU 30 reads a required operation point for a case of the restart of the internal combustion engine 3, the required operation point being calculated by the other routine not illustrated. As mentioned above, the required operation point is defined by the engine speed and engine torque of the internal combustion engine 3.

At step S14, the ECU 30 determines whether the required operation point belongs to the reduced-cylinder operation allowed region A2 (see FIG. 2). In a case that the required operation point belongs to the reduced-cylinder operation allowed region A2, the ECU 30 goes to step S15. On the other hand, in a case that the required operation point does not belong to the reduced-cylinder operation allowed region A2, it should be understood that the required operation point belongs to the All-cylinder operation allowed region A1. Due to this, the ECU 30 selects at step S17 the all-cylinder restart mode where the internal combustion engine 3 is restarted with the all-cylinder operation, as a restart mode for restarting the internal combustion engine 3.

At step S15, the ECU 30 determines by referring to the intermittent stoppage timer Ts, whether the value of the intermittent stoppage timer Ts is equal to or larger than a threshold value T1. The threshold value T1 is set for avoiding the restriction of execution of the reduced-cylinder operation in a case of a short-time intermittent stoppage which does not affect increase of the PN because the inside temperature of the cylinder little decreases. In a case that the value of the intermittent stoppage timer Ts is smaller than the threshold value T1, it is not necessary to restrict the execution of the reduced-cylinder operation. Due to this, at step 18 the ECU 30 selects as the restart mode of the internal combustion engine 3, a reduced-cylinder restart mode where the internal combustion engine 3 is restarted with the reduced-cylinder operation. On the other hand, in a case that the value of the intermittent stoppage timer Ts is equal to or larger than the threshold value T1, the ECU 30 goes to step S16.

At step S16, the ECU 30 determines whether the required operation point belongs to the reduced-cylinder operation restricted region α. In a case that the required operation point belongs to this region α, the ECU 30 selects the all-cylinder restart mode at step S17, and if this is not the case, the ECU 30 selects the reduced-cylinder operation mode at step S18.

At step S19, the ECU 30 controls the internal combustion engine 3, the first motor generator 4 and the like so that the internal combustion engine 3 is restarted in the restart mode selected at either step S17 or step S18. Thereby, in a case that the required operation point of the internal combustion engine 3 belongs to the reduced-cylinder operation allowed region A2 (step S14) and also lies on the high load side of the region A2 (step S16), the internal combustion engine 3 is restarted with the all-cylinder operation. That is, even if the required operation point belongs to the reduced-cylinder operation allowed region A2 where the reduced-cylinder operation is allowed, in a case that the required operation point lies on the high load side thereof, the all-cylinder operation is executed.

At step S20, the ECU 30 sets the restart elapse timer Tc to an initial value. For example, 1 may be set as this initial value. At step S21, the ECU 30 refers to the value of the intermittent stoppage timer Ts and determines a threshold value T2 so that the threshold value T2 becomes larger as the value of the intermittent stoppage timer Ts gets larger. The threshold value T2 is used for determining a period (a particular operation time) that the reduced-cylinder operation is restricted but the all-cylinder operation is executed. The threshold value T2 is set so that the inside temperature of the cylinder reaches a temperature where the PN generation amount gets to a predetermined value or smaller. Next, at step S22, the ECU 30 resets the intermittent stoppage timer Ts. Then, the ECU 30 ends this current routine.

At step S23, the ECU 30 increments the restart elapse timer Tc. For example, in a case that the initial value of the restart elapse timer Tc is set to 1, in order to increment the restart elapse timer Tc, the ECU 30 updates the restart elapse timer Tc by adding 1 to the value of the timer Tc.

At step S24, the ECU 30 determines whether the value of the restart elapse timer Tc is equal to or larger than the threshold value T2. In a case that the value of the restart elapse timer Tc is smaller than the threshold value T2, the ECU 30 goes to step S26 to continue the all-cylinder operation. On the other hand, in a case that the value of the restart elapse timer Tc is equal to or larger than the threshold value T2, the ECU 30 goes to step S25 to switch the cylinders mode from the all-cylinder operation to the reduced-cylinder operation, and the ECU 30 ends this current routine.

According to the present embodiment, even if the required operation point belongs to the reduced-cylinder operation allowed region A2 where execution of the reduced-cylinder operation is allowed, in a case that the required operation point belongs also to the reduced-cylinder operation restricted region α, the reduced-cylinder operation is executed after the all-cylinder operation is executed. By this execution of the all-cylinder operation, it is possible to raise the inside temperature of the cylinder while suppressing increase of the fuel injection quantity per cylinder. Accordingly, since the reduced-cylinder operation can be executed avoiding a situation that a possibility that the PN increases becomes higher, it is possible to suppress increase of the PN in comparison with a case that the reduced-cylinder operation is executed immediately after the restart.

Further, as mentioned above, the threshold value T2 for determining the period of executing the all-cylinder operation becomes larger as a value of the intermittent stoppage timer Ts gets larger. And also, the value of the intermittent stoppage timer Ts becomes larger, as the intermittent stoppage time, the time from the latest stoppage of the internal combustion engine 3 up to this restart of the internal combustion engine 3, gets longer. Accordingly, in a case that the all-cylinder operation is executed because the required operation point belongs to the reduced-cylinder operation restricted region α at the moment of restart, the all-cylinder operation is executed in a longer time as the intermittent stoppage time gets longer. As mentioned above, the particular operation time indicating an execution time of the all-cylinder operation is set so that the inside temperature of the cylinder becomes a temperature where the PN generation amount is equal to or smaller than a predetermined value. Accordingly, in a case that the intermittent stoppage time is short and an inside temperature of the cylinder is comparatively high, it is possible to avoid that the particular operation is executed in an excessively long time and to switch the cylinders mode to the reduced-cylinder operation as early as possible. Thereby, in a case that the inside temperature of the cylinder is comparatively high because of a short intermittent stoppage time, it is possible to switch the cylinders mode to the reduced-cylinder operation as early as possible with avoiding that the all-cylinder operation is executed in an excessively long time. Thereby, it is possible to reduce a demerit such as deterioration of fuel efficiency which could be caused by a prolonged all-cylinder operation.

Figure 6:
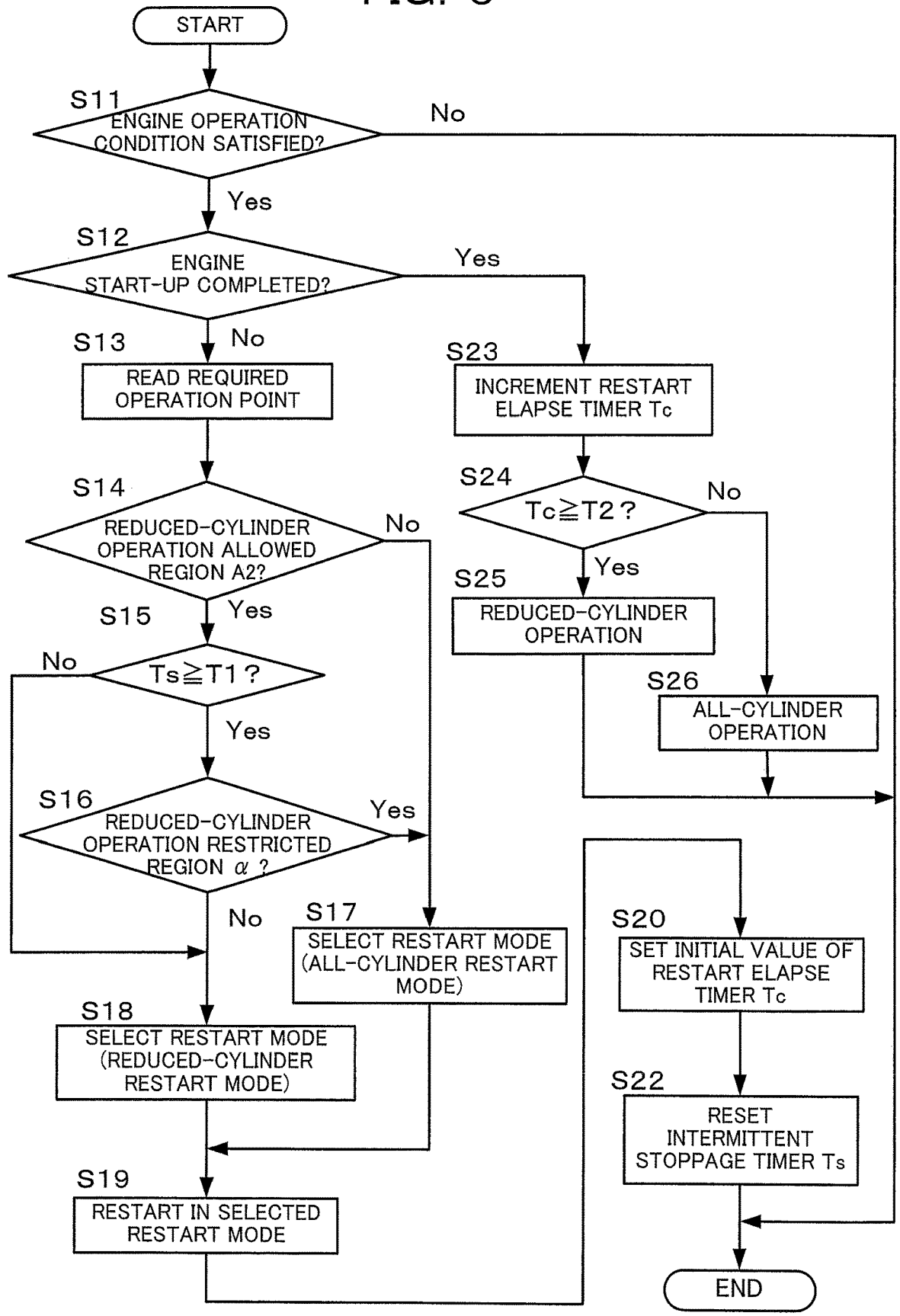
FIG. 6 is a flow chart showing one example of a control routine according to a variation of the first embodiment, the control routine being used for restart and operation after the restart of the internal combustion engine.

While, instead of a control that the ECU 10 determines the execution time of the all-cylinder operation at step S24 shown in FIG. 5 by determining the threshold value T2 at step S21, for example, possible is such a control that the threshold value T2 is determined in advance as a fixed value which does not change depending on the intermittent stoppage time, and the execution time of the all-cylinder operation is set to a fixed period. Instead of the control routine in FIG. 5, this control is possible to be realized by the ECU 30 which executes a control routine shown in FIG. 6, where step S21 is deleted from the control routine of FIG. 5. Also in this modification, since the execution of the reduced-cylinder operation is restricted, it is possible to suppress increase of the PN.

Figure 7:
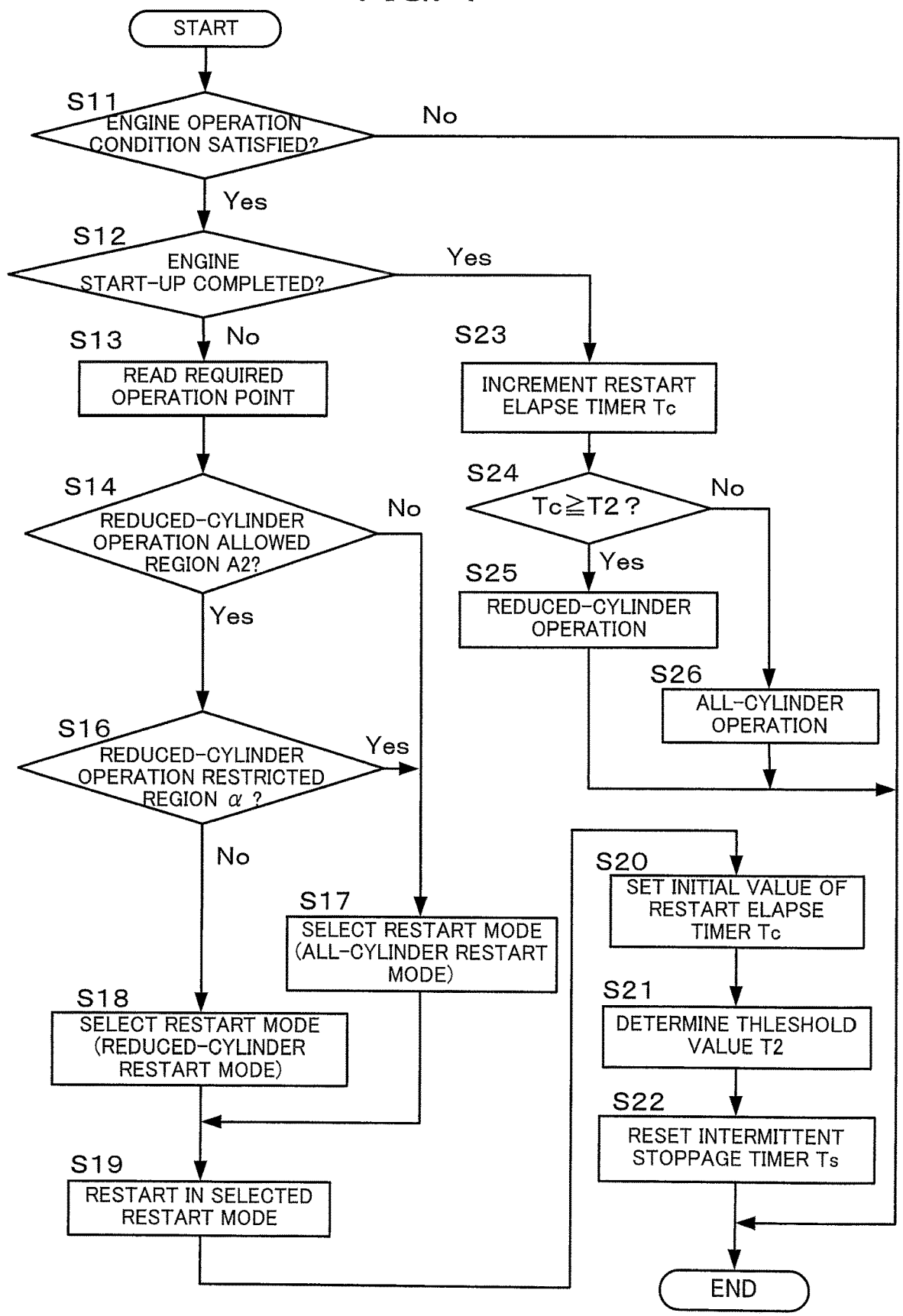
FIG. 7 is a flow chart showing one example of a control routine according to another variation of the first embodiment, the control routine being used for restart and operation after the restart of the internal combustion engine.

Further, instead of a control which the ECU 30 executes at step S15 to avoid the restriction of execution of the reduced-cylinder operation when the intermittent stoppage time is a short time, it is possible to restrict the execution of the reduced-cylinder operation regardless of how long the intermittent stoppage time is. This control is possible to be realized by the ECU 30 which executes, instead of the control routine shown in FIG. 5, a control routine shown in FIG. 7, where step S15 is deleted from the control routine of FIG. 5. Thereby, in a case that the required operation point of the internal combustion engine 3 belongs to the reduced-cylinder operation allowed region A2 (step S14), and also lies on a high load side thereof (step S16), the internal combustion engine 3 is restarted with the all-cylinder operation regardless of how long the intermittent stoppage time is, and thereafter, the all-cylinder operation is switched to the reduced-cylinder operation. Even in such a modification, since execution of the reduced-cylinder operation is restricted regardless of how long the intermittent stoppage time is, it is possible to suppress increase of the PN. In addition, another embodiment where step S21 is deleted from the control routine of FIG. 7 is also possible.

(Second Embodiment)

Next, in reference to FIGS. 8 and 9, a second embodiment of the present invention will be described. Although being common to the first embodiment in physical constructions and basic control contents, the second embodiment is different from the first embodiment in a point that an integrated air quantity is used as a parameter for determining the execution time of the all-cylinder operation. Since the physical constructions of the second embodiment are in common with the first embodiment, the explanation thereof will be omitted. Further, with respect to the control in the second embodiment, the explanations of processing which are in common with the first embodiment will be omitted or simplified.

Figure 8:
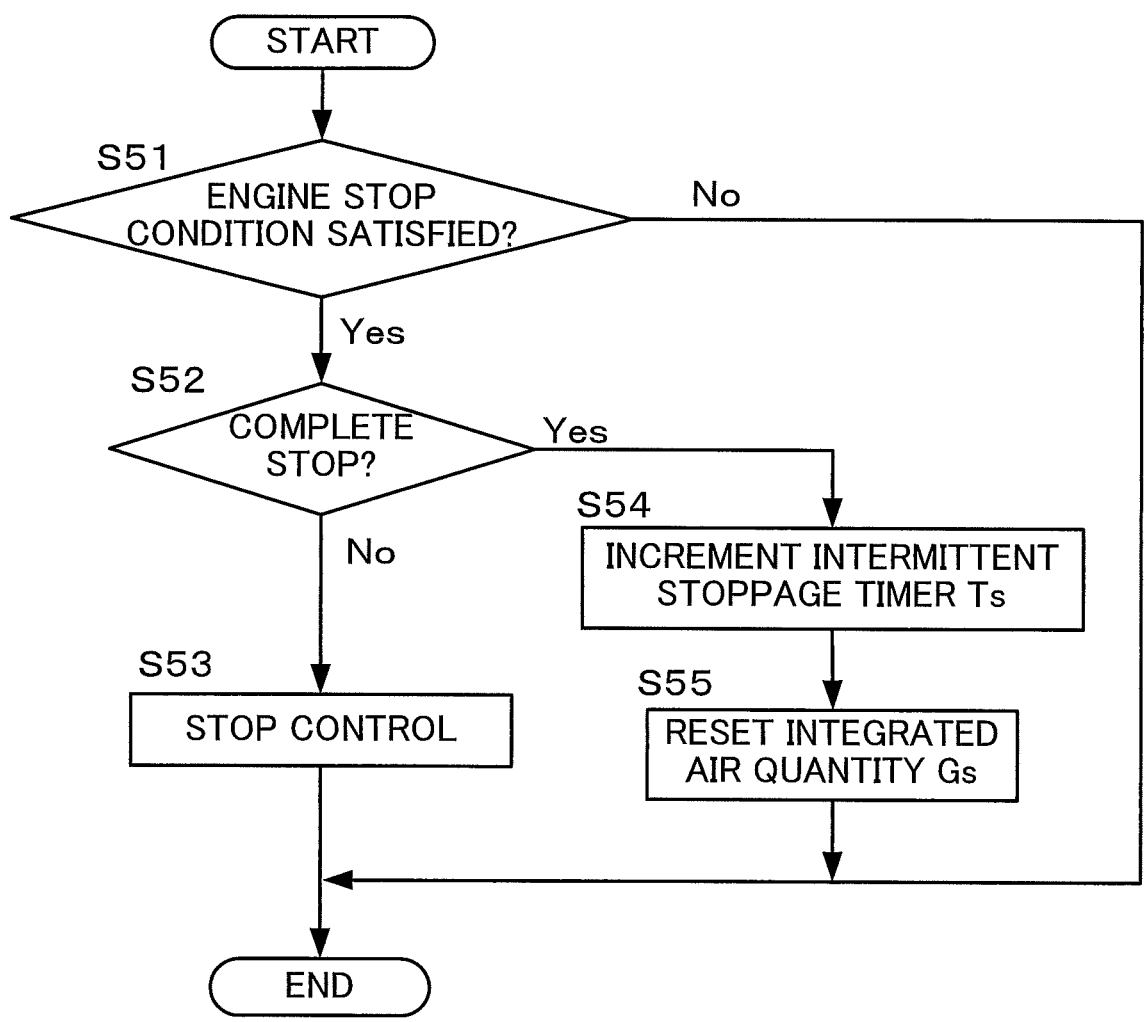
FIG. 8 is a flow chart showing one example of a control routine according to a second embodiment, the control routine being used for stopping the internal combustion engine.
Figure 9:
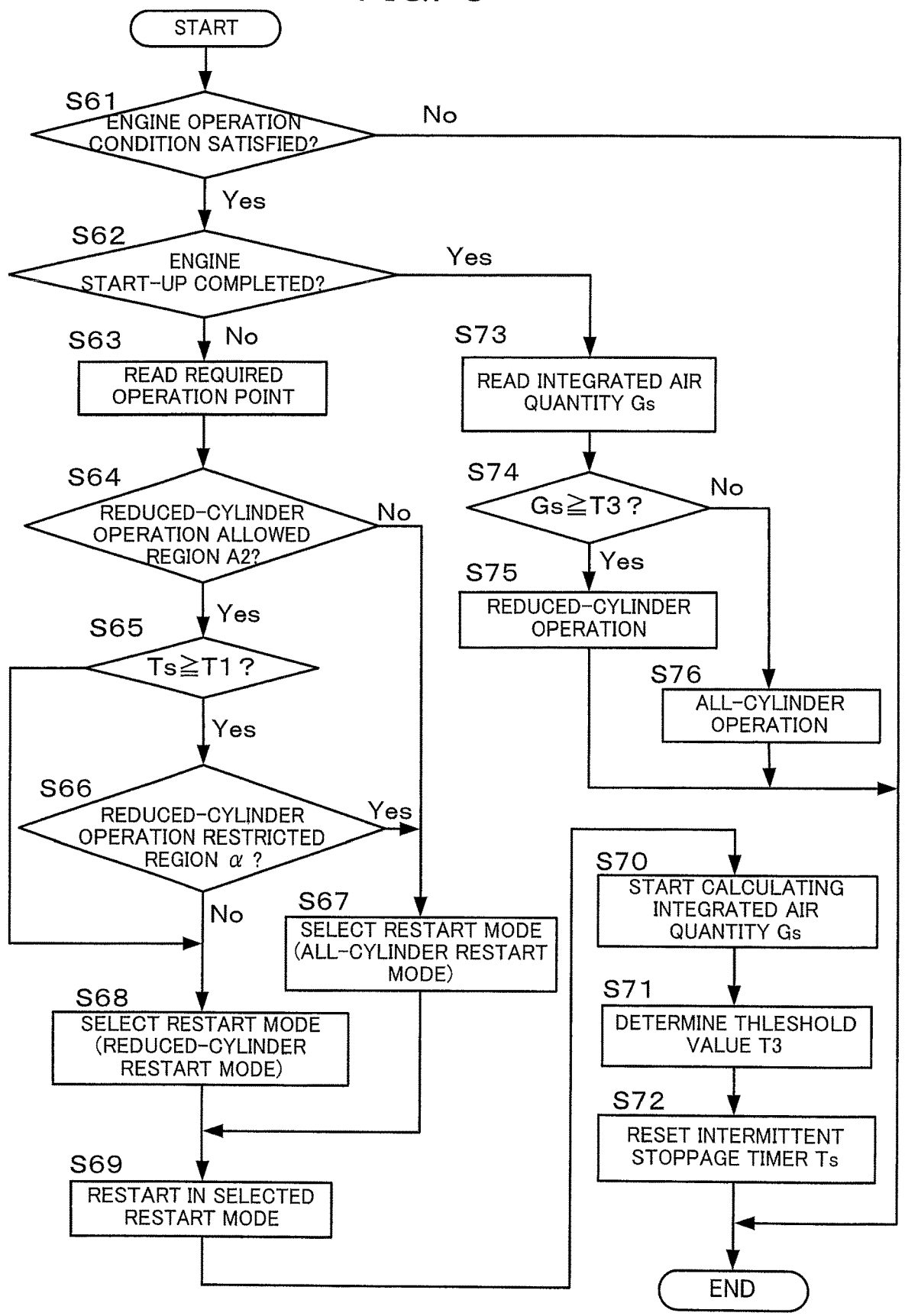
FIG. 9 is a flow chart showing one example of a control routine according to the second embodiment, the control routine being used for restart and operation after the restart of the internal combustion engine.

The control in the second embodiment is executed by the ECU 30 which executes control routines shown in FIGS. 8 and 9. Computer programs for the control routines of FIGS. 8 and 9 are held by the ECU 30, and each of the programs is read out as necessary to be executed repeatedly at predetermined intervals. Thereby, the ECU 30 functions as the control device of the present invention.

The stoppage of the internal combustion engine 3 is executed by the control routine shown in FIG. 8. At step S51, the ECU 30 determines whether the engine stoppage condition has been satisfied or not. In a case that the engine stoppage condition has been satisfied, the ECU 30 goes to step S52, and if this is not the case, the ECU 30 skips the following steps and ends this current routine.

At step S52, the ECU 30 determines whether the stoppage of the internal combustion engine 3 has been completed or not. In a case that the stoppage of the internal combustion engine 3 has not been completed, the ECU 30 goes to step S53 to execute the stop control of the internal combustion engine 3. On the other hand, in a case that the stoppage of the internal combustion engine 3 has been completed, the ECU 30 goes to step S54 to increment the intermittent stoppage timer Ts. Next, at step S55, the ECU 30 resets an integrated air quantity Gs which is flown into the internal combustion engine 3, and ends this current routine. The integrated air quantity Gs is a variable set for the ECU 30, and is updated successively from the start of calculation thereof until the reset thereof. The intake air quantity is detected by the ECU 30 which refers to an output signal from an air flow meter not illustrated.

The restart following after the intermittent stoppage of the internal combustion engine 3 and the operation thereafter are executed by the control routine shown in FIG. 9. Since each processing of the steps S61 to S69 in FIG. 9 is the same as each processing of the steps S11 to S19 in FIG. 5, the explanations thereof will be omitted. By the processing of the steps S61 to S69, even if the required operation point belongs to the reduced-cylinder operation allowed region A2 where the reduced-cylinder operation is possible, in a case that the required operation point lies on a high load side thereof, the all-cylinder operation is executed.

At step S70, the ECU 30 starts calculating the integrated air quantity Gs. Next, at step S71, the ECU 30 refers to the value of the intermittent stoppage timer Ts, and determines a threshold value T3 so that the larger the value of the intermittent stoppage timer Ts gets, the larger the threshold value T3 becomes. The threshold value T3 is used for determining a period (a particular operation period) that the reduced-cylinder operation is restricted but the all-cylinder operation is executed. The threshold value T3 is set so that the inside temperature of the cylinder reaches a temperature where the PN generation amount becomes equal to or smaller than a predetermined value. Next, at step S72, the ECU 30 resets the intermittent stoppage timer Ts. Then, the ECU 30 ends this current routine.

At step S73, the ECU 30 reads the current integrated air quantity Gs. Next, at step S74, the ECU 30 determines whether the current integrated air quantity Gs is equal to or larger than the threshold value T3. In a case that the value of the integrated air quantity Gs is smaller than the threshold value T3, the ECU 30 goes to step S76 to continue the all-cylinder operation. On the other hand, in a case that the value of the integrated air quantity Gs is equal to or larger than the threshold value T3, the ECU 30 goes to step S75 to switch the cylinders mode from the all-cylinder operation to the reduced-cylinder operation and ends this current routine.

According to the present embodiment, as with the first embodiment, it is possible to suppress the increase of the PN. Further, since the threshold value T3 for determining the period that the all-cylinder operation is executed, is set to a larger value as the value of the intermittent stoppage timer Ts gets larger, the all-cylinder operation is executed in a longer time as the intermittent stoppage period gets longer, as with the first embodiment. Thereby, as with the first embodiment, it is possible to reduce a demerit such as deterioration of fuel efficiency which could be caused by a prolonged all-cylinder operation.

Especially, in the second embodiment, since the integrated air quantity integrated from the restart of the internal combustion engine 3 is used, it is possible to switch the cylinders mode to the reduced-cylinder operation at a timing when the inside temperature of the cylinder rises sufficiently so that the increase of the PN can be more infallibly suppressed in comparison with a case, such as the first embodiment, that the execution time of all-cylinder operation is determined based on the elapsed time from the restart. After the restart, the inside temperature of the cylinder more rises as the operation time of all-cylinder operation gets longer. However, the all-cylinder operation following after the restart is not always a steady operation. For example, in a case that the load (the air quantity) changes along with time, even if the inside temperature of the cylinder is estimated based on only operating time, an actual inside temperature of the cylinder changes depending on the load with respect to the same operating time. Accordingly, in the second embodiment, using the integrated air quantity, the difference in the load is reflected on the estimation of the inside temperature of the cylinder. Therefore, even if the all-cylinder operation is not the steady operation, it is possible to obtain accurately the inside temperature of the cylinder of the internal combustion engine 3. Thereby, the second embodiment is possible to determine the execution time of the all-cylinder operation more appropriately than the first embodiment. Due to this, it is possible to infallibly avoid making the all-cylinder operation prolonged while suppressing the increase of the PN.

Figure 10:
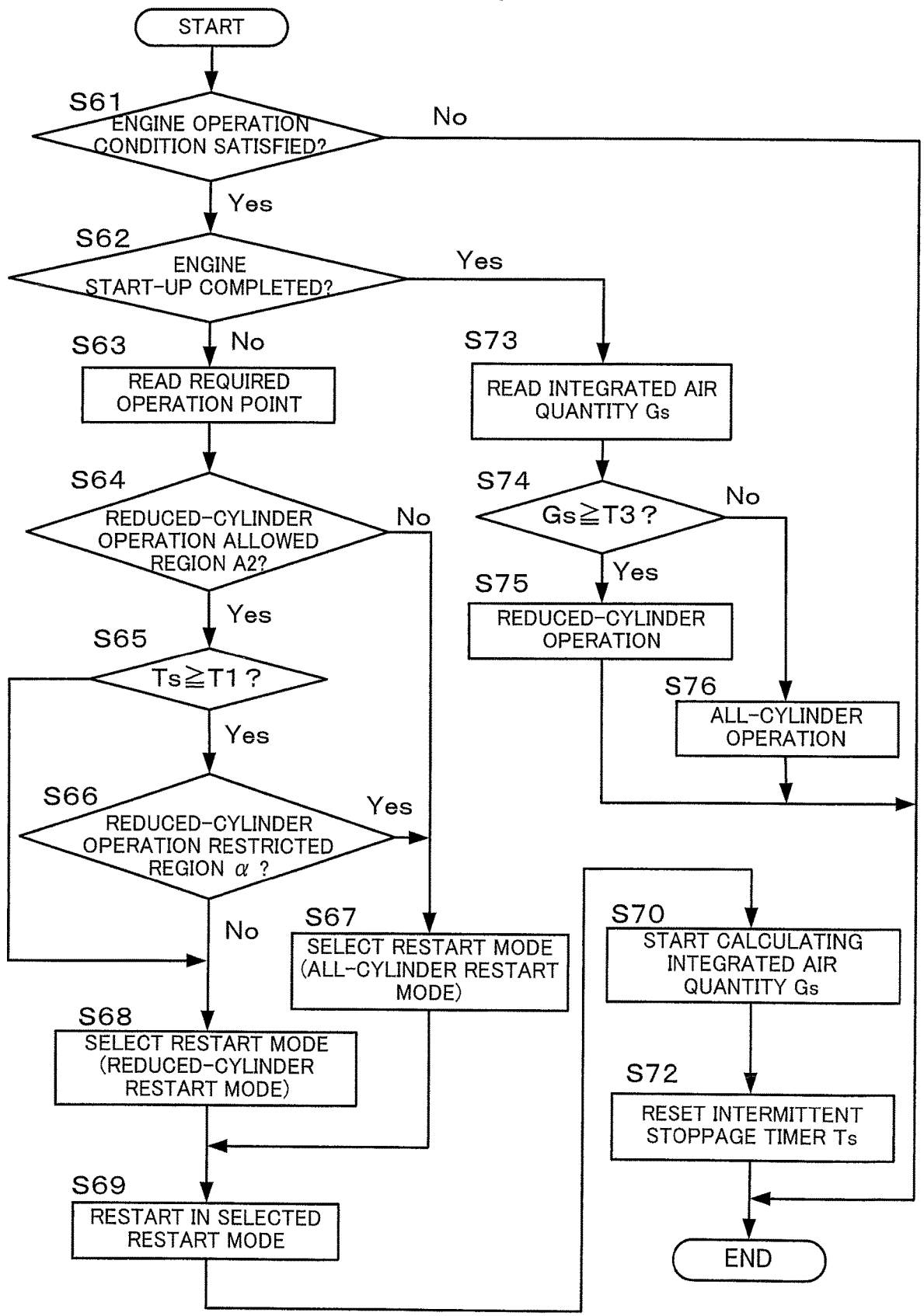
FIG. 10 is a flow chart showing one example of a control routine according to a variation of the second embodiment, the control routine being used for restart and operation after the restart of the internal combustion engine.

Instead of the control that the ECU 30 determines the threshold value T3 at step S71 in FIG. 9 and thereby the execution time of all-cylinder operation is determined at step S74, for example, the following control is possible: the execution time of all-cylinder operation is determined by setting in advance the threshold value T3 as a fixed value which is unchangeable depending on the intermittent stoppage time. This control can be realized by the ECU 30 which executes, instead of the control routine of FIG. 9, a control routine shown in FIG. 10 where step S71 is deleted from the control routine of FIG. 9. Even in the modification like this, since the execution of reduced-cylinder operation is restricted, it is possible to suppress the increase of the PN.

Figure 11:
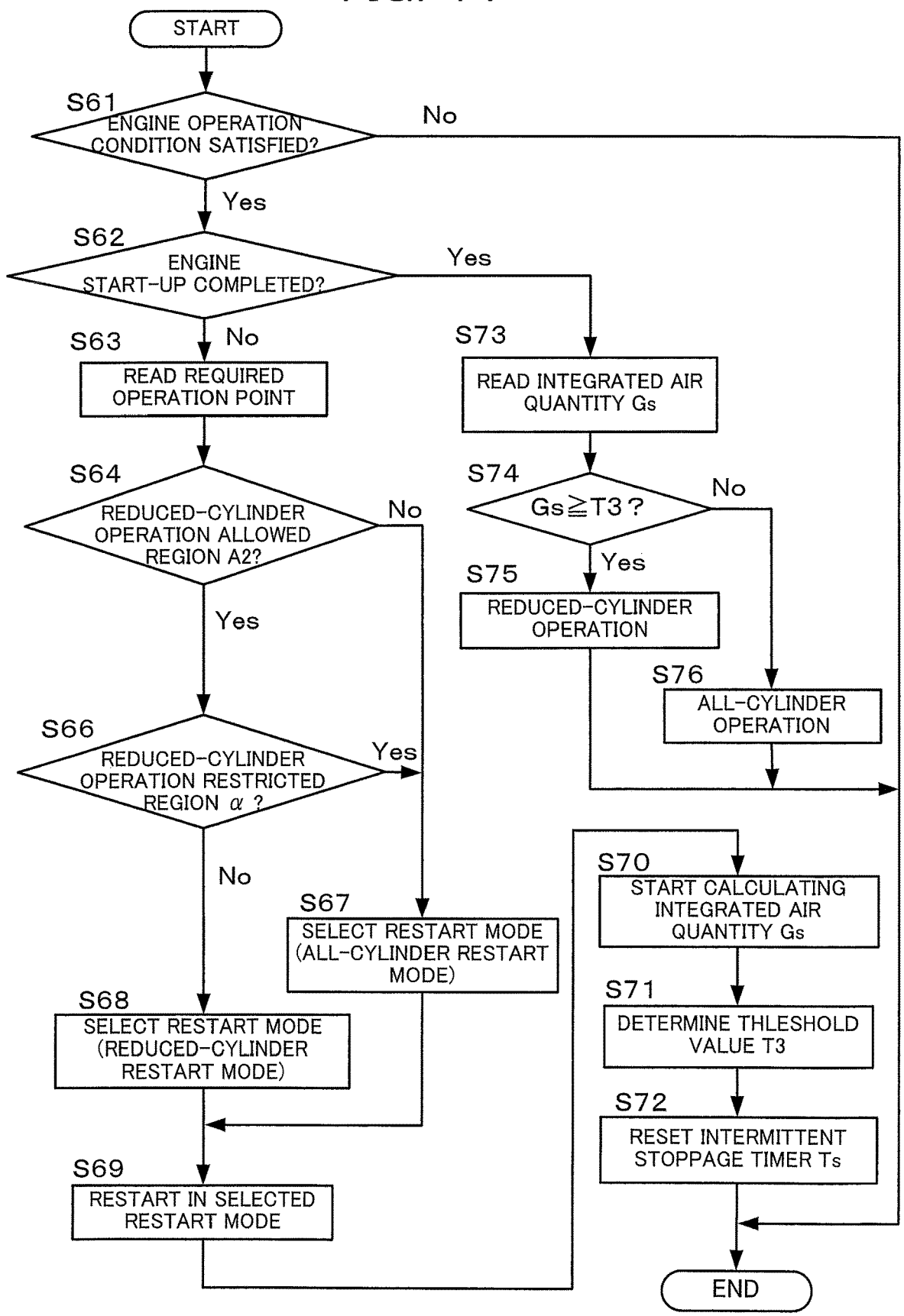
FIG. 11 is a flow chart showing one example of a control routine according to another variation of the second embodiment, the control routine being used for restart and operation after the restart of the internal combustion engine.

Further, instead of the control that the ECU 30 executes step S65 where in a case of a short intermittent stoppage time, it is avoided to restrict the execution of reduced-cylinder operation, the execution of reduced-cylinder operation may be restricted regardless of how long the intermittent stoppage time is. This control can be realized by the ECU 30 which executes, instead of the control routine of FIG. 9, a control routine shown in FIG. 11 where step S65 is deleted from the control routine of FIG. 9. Thereby, in a case that the required operation point of the internal combustion engine 3 belongs to the reduced-cylinder operation allowed region A2 (step S64), and also lies on a high load side thereof (step S66), the internal combustion engine 3 is restarted in a state of the all-cylinder operation, and thereafter, the cylinders is switched to the reduced-cylinder operation. Also in such a modification, since the execution of reduced-cylinder operation is restricted regardless of how long the intermittent stoppage time is, it is possible to suppress the increase of the PN. Further, an embodiment where step S71 is deleted in a control routine of FIG. 11 is also possible.

The present invention is not limited to the above embodiments, and is possible to be executed in various embodiments within a range of a summary of the present invention. In the above each embodiment, the present invention is applied to the internal combustion engine installed in the hybrid vehicle as an internal combustion engine which is restarted following after the intermittent stoppage. However, it is not necessary that the present invention is applied to an internal combustion engine installed in a hybrid car. For example, it is also possible to apply the present invention to an internal combustion engine installed in a vehicle which is configured to execute the idling stop that the internal combustion engine is stopped while the vehicle stops and is restarted when the vehicle starts traveling. Further, it is not necessary to apply the present invention to a spark ignition internal combustion engine. The present invention is also possible to be applied to a diesel engine.

In the control mentioned in the above embodiments, after the all-cylinder operation as the particular operation is executed, the cylinders mode is switched to the reduced-cylinder operation. However, the all-cylinder operation is only one example of the particular operation. For example, in a case that the present invention is applied to an internal combustion engine which can make the number of operating cylinders change in a stepwise manner from the reduced-cylinder operation up to the all-cylinder operation, an operation where more cylinders are being operated than in the reduced-cylinder operation is practicable as the particular operation, instead of the above mentioned all-cylinder operation. Also in this case, since the fuel injection quantity per cylinder becomes smaller than in the reduced-cylinder operation, it is possible to obtain the effect that the increase of the PN is suppressed.

In the control mentioned in the above embodiments, whether the internal combustion engine 3 is in the high load side or not is determined depending on whether the required operation point belongs to the reduced-cylinder operation restricted region α. However, using the reduced-cylinder operation restricted region α is only one example. For example, the reduced-cylinder operation may be restricted by the following way: in a case that the required operation point belongs to a reduced-cylinder operation allowed region A, the load of the internal combustion engine is calculated, and it is determined that the required operation point lies on the high load side when the calculated load exceeds a predetermined threshold value. The fuel injection quantity can be used as a substitute for the load of this case.

REFERENCE SINGS LIST

3 Internal Combustion Engine
30 ECU (Control Device)
A2 Reduced-Cylinder Operation Allowed Region

What is claimed is:

1. A control device for an internal combustion engine having a plurality of cylinders and executing a reduced-cylinder operation mode where a part of the plurality of cylinders are operated and the rest of the plurality of cylinders are halted and a particular-cylinder operation mode where the number of operating cylinders are larger than that in the reduced-cylinder operation, the control device is configured to execute a computer program by a computer:
   i) to start the internal combustion engine in the reduced-cylinder operation mode and maintain the reduced-cylinder operation mode without changing to the particular-cylinder operation mode when a required operation point belongs to a reduced-cylinder operation allowed region and an engine torque of the internal combustion engine is in a low load side in a case of restart following intermittent stoppage of the internal combustion engine; and
   ii) to start the internal combustion engine in the particular-cylinder operation mode and change to the reduced-cylinder operation mode from the particular-cylinder operation mode as a coolant temperature rises after the starting of the internal combustion engine when the required operation point belongs to the reduced-cylinder operation allowed region and the engine torque of the internal combustion engine is in a high load side in another case of restart following intermittent stoppage of the internal combustion engine,
   wherein the required operation point is defined by an engine speed and the engine torque of the internal combustion engine.

2. The control device according to claim 1, being further configured to control the internal combustion engine so that the particular operation is executed longer as intermittent stoppage time which is duration from a moment of last stoppage up to a moment of restart this time gets longer.

3. The control device according to claim 1, being further configured to execute an all-cylinder operation where all of the plurality of cylinders are operated as the particular operation.

4. A control device for an internal combustion engine having a plurality of cylinders and executing a reduced-cylinder operation mode where a part of the plurality of cylinders are operated and a rest of the plurality of cylinders are halted and a particular-cylinder operation mode where more cylinders are operated than in the reduced-cylinder operation, the control device is configured to execute a computer program by a computer:
   i) to start the internal combustion engine in the reduced-cylinder operation mode and maintain the reduced-cylinder operation mode without changing to the particular-cylinder operation mode, under a required operation point being first load on a low load side;
   ii) to set a predetermined time period during which the particular-cylinder operation mode is operated such that an inside temperature of one or more cylinder reaches a threshold temperature where a number of pieces of emission particulates reaches a predetermined value or smaller, and
   iii) to start the internal combustion engine in the particular-cylinder operation mode and change to the reduced-cylinder operation mode from the particular-cylinder operation mode under a condition that an elapse time after the starting of the internal combustion engine is equal to or longer than the predetermined time period, under the required operation point being second load which is higher than the first load on the low load side.

* * * * *